Oct. 1, 1957 — T. C. HACKER ET AL — 2,808,226
TURBINE NOZZLE BOX
Filed Feb. 8, 1952

INVENTORS
Theodore C. Hacker, Robert A. Chase, Patrick E. Carter
BY
Wm. H. Dean
AGENT

United States Patent Office 2,808,226
Patented Oct. 1, 1957

2,808,226
TURBINE NOZZLE BOX

Theodore C. Hacker, Lakeside, Robert A. Chase, San Diego, and Patrick E. Carter, El Cerrito, Calif., assignors to The Ryan Aeronautical Co., San Diego, Calif., a corporation of California Application February 8, 1952, Serial No. 270,568

3 Claims. (Cl. 253—78)

Our invention relates to a turbine nozzle box for use in connection with gas turbines and the objects of our invention are;

First, to provide a turbine nozzle box which is not adversely affected by thermal expansion.

Second, to provide a turbine nozzle box of this class in which thermal expansion will not induce stresses in the vanes adjacent the turbine wheel which has heretofore caused failure of such vanes and departure thereof from optimum shape.

Third, to provide a turbine nozzle box of this class having inner and outer rings and angular groove portions in which the vanes are held and in which they are free to expand, whereby such freedom permits them to shift without departing from optimum shape.

Fourth, to provide a turbine nozzle box of this class having sheet metal entrance ducts interconnecting the inner and outer rings between which the vanes are mounted. These ducts are capable of withstanding stresses imposed by expansion of the rings between which the vanes are mounted.

Fifth, to provide a turbine nozzle box of this class which effectively prevents nozzle leakage adjacent turbine wheels.

Sixth, to provide a nozzle box of this class which is of very light weight construction compared to other known nozzle boxes for use in connection with conventional turbine installations.

Seventh, to provide a turbine nozzle box of this class providing for gas flow characteristics therein approaching non-eddying laminar flow which results in an overall efficiency increase, and Eighth, to provide a turbine nozzle box of this class which is very simple and economical of construction, efficient in operation and which will not readily deteriorate or get out of order.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon forming a part of this application, in which:

Similar characters of reference refer to similar parts and portions throughout the several views of the drawings.

The rings 1 and 2, vanes 3 and ducts 4, 5, 6 and saddles 7 constitute the principal parts and portions of our turbine nozzle box.

Figure 1:
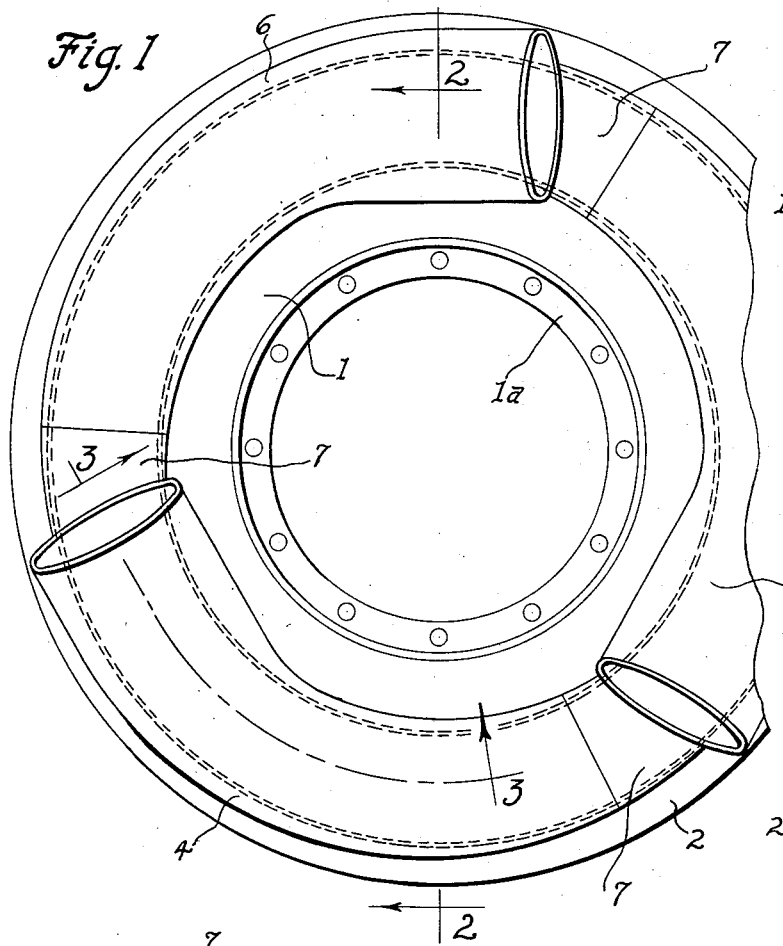
Fig. 1 is a fragmentary axial side elevational view of our turbine nozzle box.
Figure 2:
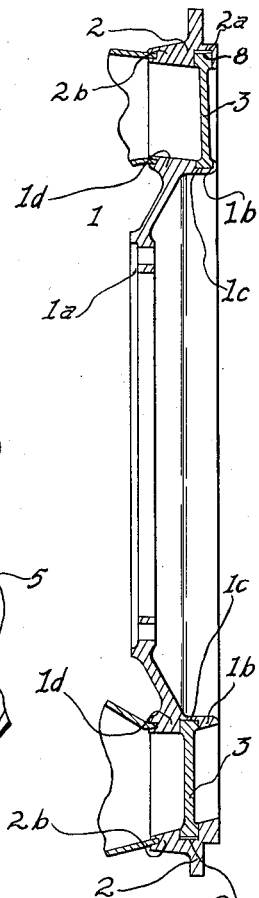
Fig. 2 is a fragmentary sectional view thereof taken from the line 2—2 of Fig. 1.

Our turbine nozzle box is provided with an inner ring 1 having a hub portion 1a concentric therewith as shown best in Figs. 1 and 2 of the drawings. This ring 1 is provided with a nozzle supporting flange 1b having an angular groove 1c therein in which the vanes 3 are supported. The vanes 3 are preferably fused at their inner ends within the angular groove 1c by a suitable high temperature brazing alloy or the like. The ring 2 surrounds the ring 1 and the vanes 3 and is provided with an internal angular groove 2a which receive the outer end of the vanes 3. Expansion clearance 8 outwardly of the ends of the vanes 3 is provided within the groove 2a to permit them to expand thermally without becoming distorted or departing from optimum shape. These rings 1 and 2 are supported in concentric spaced relationship to each other by means of duct means exemplified by the sheet metal ducts 4, 5 and 6 and saddle means exemplified by the three saddles 7 which provide a continuous circumferential duct capable of withstanding stresses imposed therein by relative thermal expansion of the rings 1 and 2. The primary support structure is carried by the three saddles 7. These ducts 4, 5 and 6 are preferably made of stainless steel sheet metal or other comparable material and are disposed chordal to the annular row of vanes 3 between the rings 1 and 2. The ducts 4, 5 and 6 are disposed at an acute angle to the above mentioned circumferential duct and lead thereinto. Each of the ducts has a saddle 7 which can be a cast or forged high temperature alloy or other comparable material. The entrance axis of each of these ducts is at an acute angle to the plane of the rings which is disposed at right angles to the axis of the turbine wheel. The ducts are each provided with a vane 4a substantially the shape of an airfoil which is adapted to prevent eddying and to effect substantially laminar flow of the gases within the circumferential space between the rings 1 and 2 before passing through the vanes 3.

Figure 3:
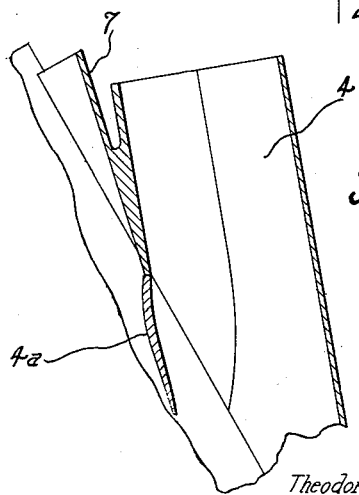
Fig. 3 is a fragmentary sectional view taken from the line 3—3 of Fig. 1.

The operation of our turbine nozzle box is substantially as follows: When gas flows through the circumferential duct the gas is directed against the vanes intermediate the rings 1 and 2 which causes thermal expansion of the rings 1 and 2 and the vanes 3. As these vanes 3 expand they are permitted to extend themselves into the angular groove 2a in the ring 2 and thus they are not caused to become distorted or to depart from optimum shape. Furthermore dangerous stresses are thereby avoided. Inasmuch as the ducts 4, 5 and 6 and saddles 7 are fused to corresponding axially extending flange portions 1d and 2b, leakage of the nozzle assembly adjacent to the turbine is eliminated. The relative expansion of the rings 1 and 2 is readily compensated for by the substantially resilient flexible construction of the sheet metal ducts 4, 5 and 6 and by slight bending of the saddles 7 which are designed for this purpose. The vanes 3 being fused in the angular groove 1c maintain their respective relationship to the turbine wheel and thereby attain the highest possible efficiency of operation. This maintenance of the vanes in proper position is promoted by the elimination of expansion stresses within the vanes due to the freedom provided by the clearance in the angular groove 2a adjacent the outer ends of these vanes 3. The laminar flow vanes in the ducts 5 and 6 similar to the vane 4a illustrated in Fig. 3 of the drawings provide for efficient flow characteristics of the gas within the circumferential duct.

Though we have shown and described a particular construction, combination and arrangement of parts and portions we do not wish to be limited thereto but desire to include in the scope of our invention, the invention substantially as set forth in the appended claims.

Having thus described our invention, what we claim as new and desire to secure by Letters Patent is:

1. In a turbine nozzle box, a pair of concentric spaced rings, vanes extending between said rings with expansion clearances provided between said vanes and one of said rings, a circumferential duct means comprising a plurality of slightly resilient saddle portions fixed in gas tight relationship with said rings and having annular inlet portions thereon disposed at an acute angle to a plane at right angles to the axis of said rings, said duct means at the transition therewith of said inlet portions having foil members of approximately airfoil shape substantially parallel to the axes of the inlet portions, and said saddle means constituting the only support structure between said rings and interconnecting said duct means.

2. In a turbine nozzle box, a pair of concentric spaced rings, vanes extending between said rings with expansion clearances provided between said vanes and one of said rings to permit freedom of thermal expansion of said vanes and a slightly resilient saddle means interconnecting said rings at one side thereof and having inlet ducts therein to conduct gas to said vanes, said rings having axially extending flange portions and said flange portions having annular grooves in which said ducts and saddle means is fused, said ducts and saddle means constituting the sole means for positive and rigid support of one ring relative to the other ring.

3. In a turbine nozzle box, a pair of concentric spaced rings, vanes extending between said rings with expansion clearances provided between said vanes and one of said rings to permit freedom of thermal expansion of said vanes and a slightly resilient saddle means interconnecting said rings at one side thereof and having inlet ducts therein to conduct gas to said vanes, said rings having axially extending flange portions, and said flange portions having annular grooves in which said ducts and saddle means is fused, said vanes at their ends opposite from said grooves being fused to the other of said rings, said ducts and saddle means constituting the sole means for positive and rigid support of one ring relative to the other ring.

References Cited in the file of this patent

UNITED STATES PATENTS

| | | |
|---|---|---|
| 2,341,148 | Kroon et al. | Feb. 8, 1944 |
| 2,402,418 | Kroon | June 18, 1946 |
| 2,567,079 | Owner et al. | Sept. 4, 1951 |
| 2,609,176 | Purvis | Sept. 2, 1952 |
| 2,625,367 | Rainbow | Jan. 13, 1953 |
| 2,654,566 | Boyd | Oct. 6, 1953 |
| 2,681,788 | Wosika | June 22, 1954 |
| 2,702,688 | Ericson | Feb. 22, 1955 |

FOREIGN PATENTS

| | | |
|---|---|---|
| 225,221 | Switzerland | Apr. 16, 1943 |
| 242,702 | Switzerland | Oct. 16, 1946 |